(12) United States Patent
Girish et al.

(10) Patent No.: US 7,559,026 B2
(45) Date of Patent: Jul. 7, 2009

(54) VIDEO CONFERENCING SYSTEM HAVING FOCUS CONTROL

(75) Inventors: Muthy K. Girish, Santa Clara, CA (US); Aram Lindahl, Palo Alto, CA (US); Andrew Grignon, Campbell, CA (US)

(73) Assignee: Apple Inc., Cupertino, CA (US)

( * ) Notice: Subject to any disclaimer, the term of this patent is extended or adjusted under 35 U.S.C. 154(b) by 846 days.

(21) Appl. No.: 10/651,918

(22) Filed: Aug. 29, 2003

(65) Prior Publication Data

US 2004/0257432 A1 Dec. 23, 2004

Related U.S. Application Data

(60) Provisional application No. 60/480,061, filed on Jun. 20, 2003.

(51) Int. Cl.
*G06F 3/00* (2006.01)
(52) U.S. Cl. .................................................. 715/716
(58) Field of Classification Search .................. 709/227
See application file for complete search history.

(56) References Cited

U.S. PATENT DOCUMENTS

| | | | |
|---|---|---|---|
| 3,836,982 A | 9/1974 | Schwartz | |
| 5,534,914 A | 7/1996 | Flohr et al. | |
| 5,548,478 A | 8/1996 | Kumar et al. | |
| D374,022 S | 9/1996 | Meinzer | |
| 5,583,565 A * | 12/1996 | Cortjens et al. | 348/14.1 |
| 5,589,878 A * | 12/1996 | Cortjens et al. | 348/211.12 |
| 5,598,209 A * | 1/1997 | Cortjens et al. | 348/211.12 |
| D395,440 S | 6/1998 | Ogasawara et al. | |
| 5,801,919 A | 9/1998 | Griencewic | |
| 5,821,922 A | 10/1998 | Sellers | |
| 5,855,343 A | 1/1999 | Krekelberg | |
| 5,900,907 A | 5/1999 | Malloy et al. | |
| 5,999,207 A | 12/1999 | Rodriguez et al. | |
| 6,094,213 A | 7/2000 | Mun et al. | |
| 6,118,653 A | 9/2000 | Kim | |
| 6,163,335 A | 12/2000 | Barraclough | |
| 6,172,703 B1 | 1/2001 | Lee | |

(Continued)

FOREIGN PATENT DOCUMENTS

EP  0781049 A2  6/1997

(Continued)

OTHER PUBLICATIONS

Proshare® Video Conferencing System, Cisco Whitepaper, Cisco Systems, Inc., http://www.intel.com/support/proshare/8161.htm, downloaded Jun. 24, 2003, pp. 1-10.

(Continued)

*Primary Examiner*—Stephen Hong
*Assistant Examiner*—Samir Termanini
(74) *Attorney, Agent, or Firm*—Beyer Law Group LLP

(57) ABSTRACT

Systems and methods for directing pickup of media content by way of user input are disclosed. These systems and methods enable desired media content to be more effectively acquired. The user input can be locally provided or remotely provided. The systems and methods for directing pickup of media content are particularly suitable for video conferencing systems. The media content being directed is, for example, video or audio.

33 Claims, 14 Drawing Sheets

U.S. PATENT DOCUMENTS

| | | | |
|---|---|---|---|
| D438,221 S | 2/2001 | Hedrick et al. | |
| D439,588 S | 3/2001 | Bergström et al. | |
| 6,243,819 B1 | 6/2001 | Jung | |
| 6,275,258 B1 * | 8/2001 | Chim | 348/211.12 |
| D454,898 S | 3/2002 | Ogasawara et al. | |
| 6,411,505 B1 | 6/2002 | DiFonzo et al. | |
| D463,467 S | 9/2002 | Sumita | |
| 6,453,336 B1 | 9/2002 | Beyda et al. | |
| 6,462,937 B1 | 10/2002 | Liao et al. | |
| 6,466,252 B1 | 10/2002 | Miyazaki | |
| 6,469,732 B1 | 10/2002 | Chang et al. | |
| 6,480,373 B1 | 11/2002 | Landry et al. | |
| 6,484,156 B1 * | 11/2002 | Gupta et al. | 707/1 |
| 6,489,986 B1 | 12/2002 | Allen | |
| 6,496,361 B2 | 12/2002 | Kim et al. | |
| D471,218 S | 3/2003 | Sekine | |
| D476,345 S | 6/2003 | Phelps et al. | |
| D477,622 S | 7/2003 | Phelps et al. | |
| 6,587,151 B1 | 7/2003 | Cipolla et al. | |
| D482,377 S | 11/2003 | Tajima | |
| 6,659,516 B2 | 12/2003 | Wang et al. | |
| 6,693,663 B1 | 2/2004 | Harris | |
| 6,731,324 B2 | 5/2004 | Levy | |
| 6,771,396 B1 | 8/2004 | Cheatle et al. | |
| 6,784,916 B2 | 8/2004 | Smith | |
| 6,788,529 B2 | 9/2004 | Homer et al. | |
| 7,061,536 B2 | 6/2006 | Cha | |
| 7,126,816 B2 | 10/2006 | Krah | |
| 7,170,551 B2 | 1/2007 | Fichtner | |
| 2001/0018349 A1 * | 8/2001 | Kinnunen et al. | 455/456 |
| 2001/0056460 A1 * | 12/2001 | Sahota et al. | 709/201 |
| 2002/0044201 A1 * | 4/2002 | Alexander et al. | 348/14.08 |
| 2002/0057347 A1 | 5/2002 | Urisaka et al. | |
| 2002/0149672 A1 | 10/2002 | Clapp et al. | |
| 2002/0198962 A1 * | 12/2002 | Horn et al. | 709/218 |
| 2003/0161093 A1 | 8/2003 | Lam et al. | |
| 2004/0017938 A1 * | 1/2004 | Cooper et al. | 382/171 |
| 2004/0257431 A1 | 12/2004 | Girish et al. | |
| 2005/0128284 A1 | 6/2005 | Hoffer et al. | |
| 2005/0168924 A1 | 8/2005 | Wu et al. | |

FOREIGN PATENT DOCUMENTS

| | | |
|---|---|---|
| JP | 03190139 | 7/1991 |
| JP | 405037836 A | 2/1993 |
| JP | 08238627 | 8/1996 |
| JP | 410073754 A | 3/1998 |
| JP | 11111690 | 4/1999 |
| JP | 2000-092356 | 3/2000 |
| JP | 02000307913 A | 11/2000 |
| JP | 2002/238040 | 8/2002 |
| JP | 2002-238040 | 8/2002 |
| WO | WO99/60788 | 11/1999 |

OTHER PUBLICATIONS

Computers/Input Devices/Web Cameras:, www.shopping.com, downloaded on Apr. 7, 2004.

Office Action dated Jan. 8, 2007; U.S. Appl. No. 10/652,157, filed Aug. 29, 2003; Girish et al.

Office Action dated Sep. 8, 2006; U.S. Appl. No. 10/652,157, filed Aug. 29, 2003; Girish et al.

Office Action dated Oct. 4, 2005; U.S. Appl. No. 10/652,157, filed Aug. 29, 2003; Girish et al.

Written Opinion dated Nov. 16, 2004 in PCT Application No. PCT/US2004/016635.

International Search Report dated Nov. 15, 2005 in PCT Application No. PCT/US04/15916.

Written Opinion dated Nov. 15, 2005 in PCT Application No. PCT/US04/15916.

Sony VAIO C1MV Picturebook with TM5800 Crusoe: http://www.pcstats.com/articleview.cfm?articleID=857; downloaded on Oct. 15, 2004.

Office Action dated Mar. 30, 2007 in U.S. Appl. No. 11/498,451.

Office Action dated Nov. 16, 2007 in U.S. Appl. No. 11/498,451.

Office Action dated Feb. 26, 2008 in U.S. Appl. No. 11/498,451.

Notice of Allowance dated Feb. 22, 2008 in U.S. Appl. No. 10/652,157.

Office Action dated Sep. 5, 2008 in U.S. Appl. No. 11/498,451.

* cited by examiner

VIDEO CONFERENCING SYSTEM HAVING FOCUS CONTROL

CROSS-REFERENCE TO RELATED APPLICATIONS

This application claims benefit of priority from U.S. Provisional Patent Application No. 60/480,061, filed Jun. 20, 2003, and entitled "SYSTEM AND METHOD FOR ENHANCED VIDEO CONFERENCING," which is hereby incorporated by reference herein.

This application is also related to U.S. patent application Ser. No. 10/652,157 filed concurrently herewith, and entitled "VIDEO CONFERENCING APPARATUS AND METHOD," which is hereby incorporated by reference herein.

BACKGROUND OF THE INVENTION

1. Field of the Invention

The present invention relates to video conferencing and, more particularly, to providing video conferencing capabilities using computing devices.

2. Description of the Related Art

Video conferencing generally refers to a live connection between two or more participants in separate locations for the purpose of audio and video communication. At its simplest, videoconferencing provides transmission of images and text between two locations. At its most sophisticated, it provides transmission of full motion video images and high quality audio between two or more locations. Video conferences may be performed using computer networks, telecommunication links, and the like. Video conferencing may be performed in a variety of ways. In one configuration, video conferencing occurs between users (participants) of computers that couple through a network. Each computer (e.g., personal computer) has associated therewith a display, video camera, microphone and speaker. As the two participants communicate via their respective computers, the sound from their voices are collected by their respective microphones and delivered to the other's speakers. In addition, whatever images appear in front of the video camera are collected by the video camera and delivered to the other participant's display. Video conferencing may also provide for sharing of data between participants.

Unfortunately, however, the video or audio pickup being utilized is not directed at an appropriate area of interest within a camera's view. Consequently, neither the video pickup nor the audio pickup tend to emphasize an appropriate area of interest. Hence, the video pickup often lacks clarity with respect to the appropriate area of interest and the audio input is often distorted by audio inputs that are from outside the area of interest. Consequently, there is a need for improved techniques to facilitate improved video and audio pickup.

SUMMARY OF THE INVENTION

Broadly speaking, the invention pertains to systems and methods for directing pickup of media content by way of user input so that desired media content is more effectively acquired. The user input can be locally provided or remotely provided. The systems and methods for directing pickup of media content are particularly suitable for video conferencing systems. The media content being directed is, for example, video or audio.

The invention can be implemented in numerous ways, including as a method, system, device, apparatus, or computer readable medium. Several embodiments of the invention are discussed below.

As an electronic device, one embodiment of the invention includes at least: a processor for executing an operating system program and a media content presentation program; a media content pickup device operatively connected to the processor, the media content pickup device captures media content input, and the media content pickup device focuses the media content input on a user-specified region of interest; and a media output device operatively connected to the processor, the media output device operates to display the focused media content input.

As a computer system, one embodiment of the invention includes at least: a processor for executing an operating system program and a video application program, a camera, and a display. The camera captures video input pertaining to its field of view. The camera focuses the video input on a determined region of the field of view in accordance with a user input. The display operates to display the video input provided by the camera.

As a method for altering a focus location for a camera using a computing apparatus having a monitor, one embodiment of the invention includes at least the acts of: receiving video input from the camera; displaying the video input on the monitor; receiving a focus region from a user; and causing the camera to focus on the focus region.

As a method for using a computing apparatus having a monitor to process audio input provided by a plurality of microphones, one embodiment of the invention includes at least the acts of: receiving audio input from the plurality of microphones; displaying a graphical user interface window on the monitor; receiving an indication of a region of interest from a user with respect to the window being displayed on the monitor; and processing the audio input to focus the audio input towards the region of interest.

As a video conferencing system operable over a network, one embodiment of the invention includes at least: a first computer system including at least a first processor for executing a first operating system program and a first video application program, a first camera to capture first video input, and a first monitor; and a second computer system operatively connectable to the first computer system via the network, the second computer system including at least a second processor for executing a second operating system program and a second video application program, a second camera to capture video input, and a second monitor. When the first computer system and the second computer system are involved in a video conference, the first monitor displays the second video input provided by the second camera via the network, and the second monitor displays the first video input provided by the first camera via the network. Further, when a first user interacts with a first graphical user interface presented on the first monitor to select a region of interest with respect to the second video input, the second camera then focuses itself so that the second video input is focused on the region of interest.

As a computer readable medium including at least computer program code for directing media content input, one embodiment of the invention includes at least: computer program code for receiving media content input from a media content input device; computer program code for receiving a user-specified region of interest for the media content input; computer program code for processing the media content input into processed media content based on the user-specified region of interest; and computer program code for directing the processed media content to an output device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to systems and methods for directing pickup of media content by way of user input so that desired media content is more effectively acquired. The user input can be locally provided or remotely provided. The systems and methods for directing pickup of media content are particularly suitable for video conferencing systems. The media content being directed is, for example, video or audio.

Embodiments of this aspect of the invention are discussed below with reference to FIGS. 1-9. However, those skilled in the art will readily appreciate that the detailed description given herein with respect to these figures is for explanatory purposes as the invention extends beyond these limited embodiments.

Figure 1:
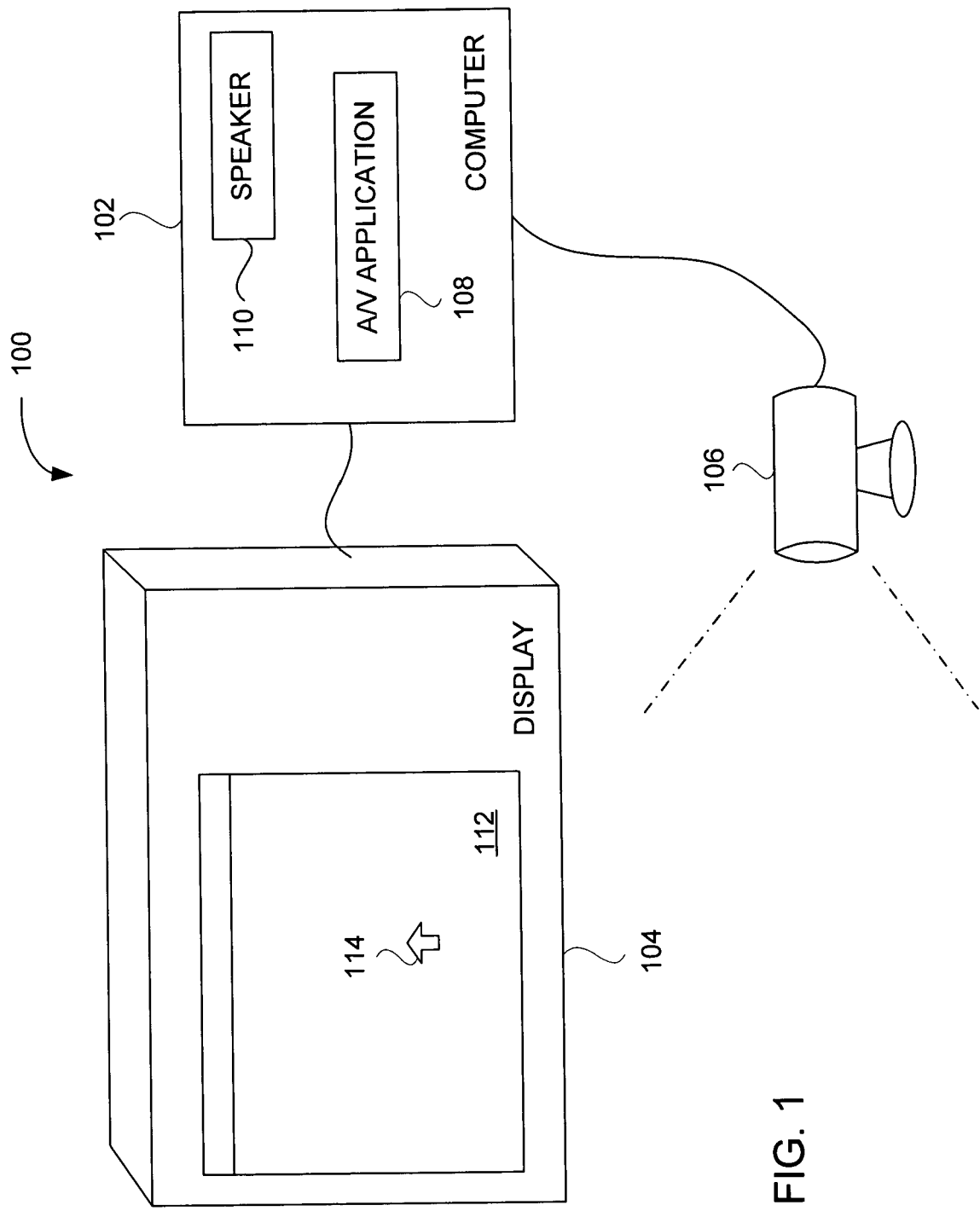
FIG. 1 is a block diagram of a multimedia computer system according to one embodiment of the invention.

FIG. 1 is a block diagram of a multimedia computer system 100 according to one embodiment of the invention. The multimedia computer system 100 includes a computer 102, a display (monitor) 104 and a camera 106. The multimedia computer system 100 can, for example, be a general purpose computer (e.g., personal computer, such as a desktop computer or a portable computer). The multimedia computer system 100 could also be or include special-purpose processing equipment or components. The computer 102 couples to the display 104 and the camera 106. The computer 102 includes an audio-video (A-V) application 108 and a speaker 110. The A/V application 108 can cause a video presentation window (video viewing window) 112 to be displayed on the display (monitor) 104. Additionally, the multimedia computer system 100 can permit a user to move a pointing indicator 114 (e.g., cursor) over the display 104, thereby enabling the user to interact with the video presentation window 112 on the display 104. More generally, the video presentation window 112 can be considered at least part of a graphical user interface presented on the display 104.

According to the invention, the camera 106 has a relatively wide field of view (e.g., 30 to 160 degrees) and provides video pickup for the computer 102. Hence, the video input provided by the camera 106 to the computer is displayed within the video presentation window 112 by the A/V application 108 operating on the computer 102.

The camera 106 also operates to automatically focus itself on an object within its field of view. By default, the camera 106 focuses on an object that is directly forward of the camera 106. However, in many instances, the user of the multimedia computer system 100 would prefer that the camera 106 focus on other objects, features or areas within its field of view (i.e., other objects, features or areas not directly forward of the camera 106). To easily permit a user of the multimedia computer system 100 to cause the camera 106 to focus on such different objects, features or areas, the user can manipulate the pointing indicator 114 to a desired area of interest with respect to the video presentation window 112 which displays the video input provided by the camera 106. When the user then selects an area of interest with respect to the video presentation window 112, the computer 102 recognizes that the user desires to have the camera 106 focus on the area of interest that has been identified. Consequently, the computer 102 informs the camera 106 to alter its focus to the region associated with the area of interest selected by the user. Once the camera 106 has altered its focus, the video input to the computer 102 subsequently received from the camera 106 is presented within the video presentation window 114 on the display 104. The resulting video being displayed is now focused with respect to the area of interest that the user has last specified.

The multimedia computer system 100 may also include at least one microphone that provides audio pickup which is supplied to the computer 102 and output via the speaker 110. Alternatively or additionally, the area of interest can be used to effectively focus audio pickup provided by the camera 106. Recall, the area of interest was identified by the user through interaction with the video presentation window 112. In one embodiment, the camera 106 can further include a plurality of microphones to provide audio pickup. In one implementation, the microphones are integral with the camera 106. More generally, the microphones are associated with the multimedia computer system 100. The audio that has been picked up by the microphones is supplied to the computer 102. The A/V application 108 within the computer 102 can process the audio pickup in accordance with the area of interest provided by the user. The result is that the audio pickup can be effectively focused to the area of interest. As a result, the audio pickup being presented or output to the speaker 110 is dominated by the audio sound provided from the area of interest. In other words, the audio sound from the area of interest is emphasized over audio sound from other areas.

In another embodiment, direction sensing analytics can be applied to the audio sound derived from the microphones to determine automatically an appropriate zone of focus for redirecting the cameras (e.g., the direction from which voices or sound is coming).

Figure 2:
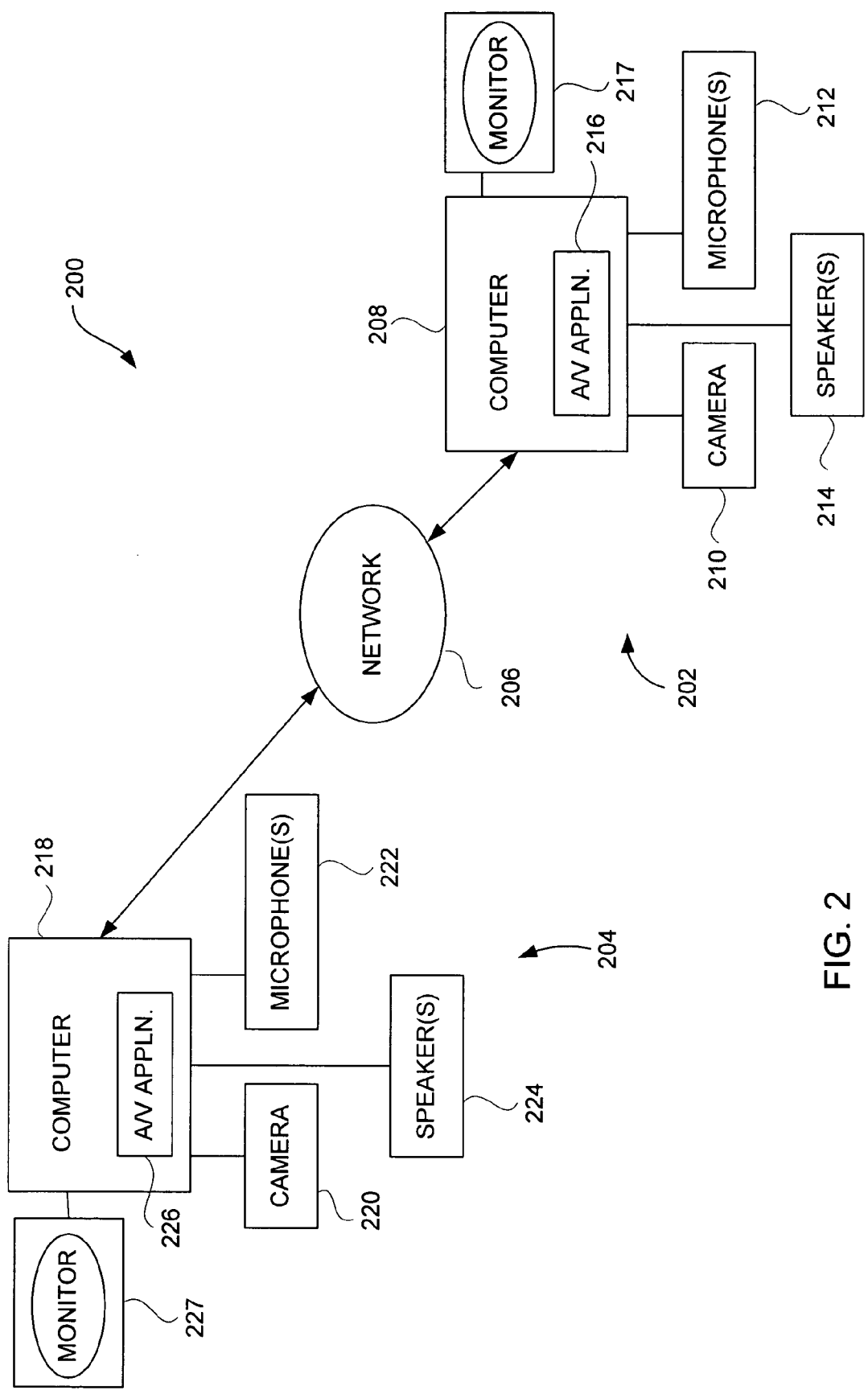
FIG. 2 is a network-based video conference system according to one embodiment of the invention.
Figure 2A:
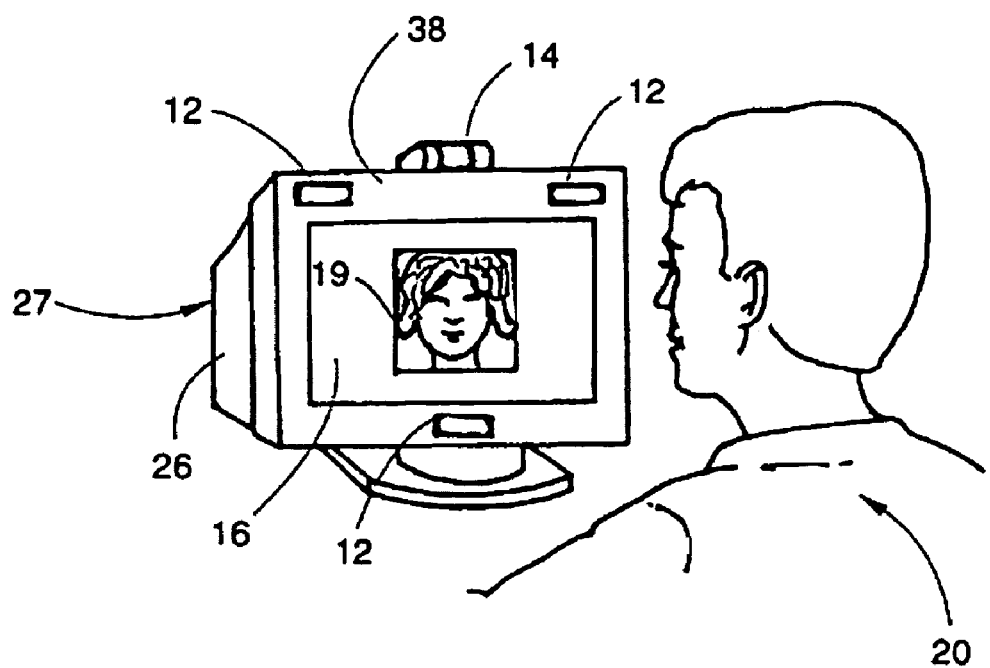

FIG. 2 is a network-based video conferencing system 200 according to one embodiment of the invention. The network-based video conferencing system 200 includes a plurality of multimedia computer systems, such as the multimedia computer systems 202 and 204 illustrated in FIG. 2. The network-based video conferencing system 200 allows two or more multimedia computer systems to participate in a video conference so as to share audio and video information across a network.

The multimedia computer system 202 is able to be operatively connected to the multimedia computer system 204 through a network 206. The network 206 can represent a variety of different networks, including wired and/or wireless networks. Often, the network 206 can include some portion of a data network such as the Internet, a local area network or a wide area network.

The multimedia computer system 202 includes a computer 208, a camera 210, microphones 212, and speakers 214. Further, the computer 208 executes an audio-video (A-V) application 216. The computer 208 also couples to a monitor 217 that displays video information.

The multimedia computer system 204 includes a computer 218, a camera 220, microphones 222, and speakers 224. The computer 218 executes an audio-video (A-V) application 226. The computer 218 also couples to a monitor 227 that displays video provided by the camera 220.

Audio and video can be exchanged by the multimedia computer systems participating in a video conference. The audio and video capture at one multimedia computer system is transmitted to and then presented at another multimedia computer system participating in the video conference.

Further, the network-based video conferencing system 200 allows a user at one multimedia computer system to inform the other multimedia computer system of its area of interest with respect to video input provided by the other multimedia computer system. For example, the computer 218 receives video input from the camera 220 and supplies such video input to the computer 208 via the network 206. The computer 208 can then display the video input from the camera 220 on the monitor 217. Typically, the video input would be presented on the monitor 217 in a video presentation window, such as the video presentation window 112 illustrated in FIG. 1. Once the video input from the other multimedia computer system 204 is displayed at the multimedia computer system 202, the user at the multimedia computer system 202 can interact with the video presentation window (or graphical user interface, more generally) to specify a particular area of interest. The area of interest is then sent by the computer 208 through the network 206 to the computer 218. Thereafter, the computer 218 informs the camera 220 to re-focus in the direction associated with the particular area of interest that has been specified by the user of the multimedia computer system 202. Once re-focused, the video input supplied to the computer 208 from the camera 220 over the network 206 is presented on the monitor 217 in the video presentation window, thus displaying to the user the video input that is now focused on the area of interest specified by the user. In summary, the area of interest specified by the user at one multimedia computer system is used by another multimedia computer system to control the focus direction utilized by its camera. The user at computer 218 can also control the direction of focus for its own associated camera 220, thereby altering the video input perceived by the remote user viewing monitor 217.

The network-based video conferencing system 200 can also cause the audio input to be focused (i.e., directed) for better and more targeted audio pickup. For example, the multimedia computer system 204 includes the microphones 222, namely, a plurality of microphones. Typically, these microphones 222 would be spaced at a fixed, relative position to one another. In one embodiment, the microphones 222 are an integral part of (e.g., within) the camera 220. However, in general, the microphones 222 can be placed elsewhere within the multimedia computer system 204. The microphones 222 capture audio input. The audio input from each of the microphones 222 is then supplied to the computer 218. The computer 218 then causes the audio input from each of the microphones to be supplied to the computer 208 via the network 206. The computer 208 performs digital signal processing on the audio inputs from the microphones 222 so that the audio sound coming from the area of interest of the user of the multimedia computer system 202 is emphasized, while the audio sound coming from other areas is de-emphasized. After the audio inputs have been processed by the digital signal processing, the resulting processed audio input is supplied to the one or more speakers 214 of the first multimedia computer system 202. Consequently, the user of the first multimedia computer system 202 is able to hear the processed audio sound pertaining to the processed audio inputs. Alternatively, some or all of the digital signal processing used to process the audio inputs can be done at the computer 218 or other available computer on the network 206.

Figure 3:
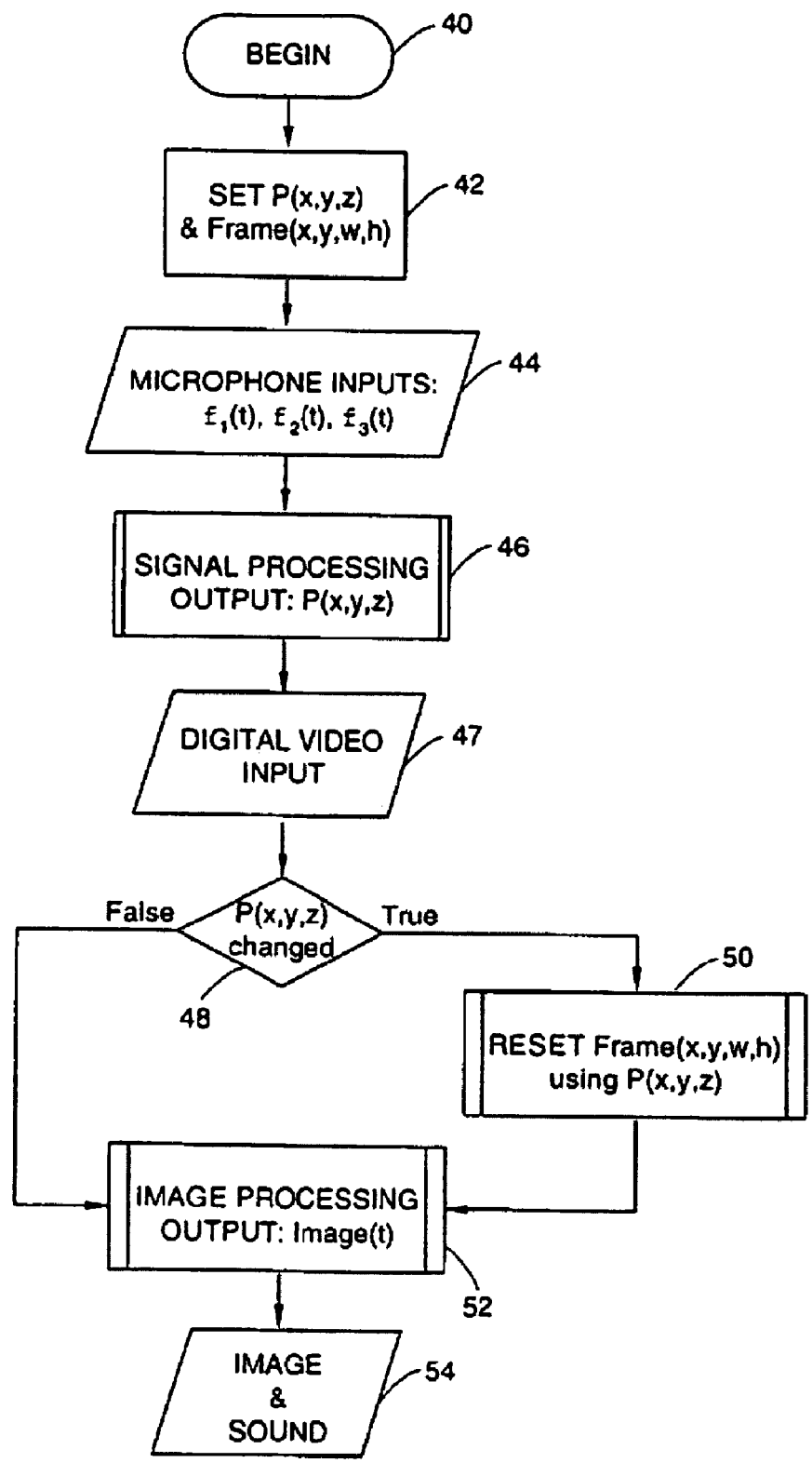
FIG. 3 is a block diagram of an exemplary software arrangement suitable for use within a multimedia computer system.

FIG. 3 is a block diagram of an exemplary software arrangement 300 suitable for use within the multimedia computer system 100 illustrated FIG. 1 or the multimedia computer systems 202 or 204 illustrated in FIG. 2.

The software arrangement 300 includes an audio-video (A-V) application 302, an operating system 304, a driver 306, and a network interface 308. The A/V application 302 operates to provide the appropriate graphical user interfaces as well as the presentation of audio and/or video information to the user. The operating system 304 and the driver 306 are layers of software provided between the A/V application 302 and a camera 310. These layers allow the A/V application 302 to communicate with the camera 310, and vice versa. The network interface 308 is software and/or hardware that enables the associated multimedia computer system to interface or communicate over a network.

Figure 4A:
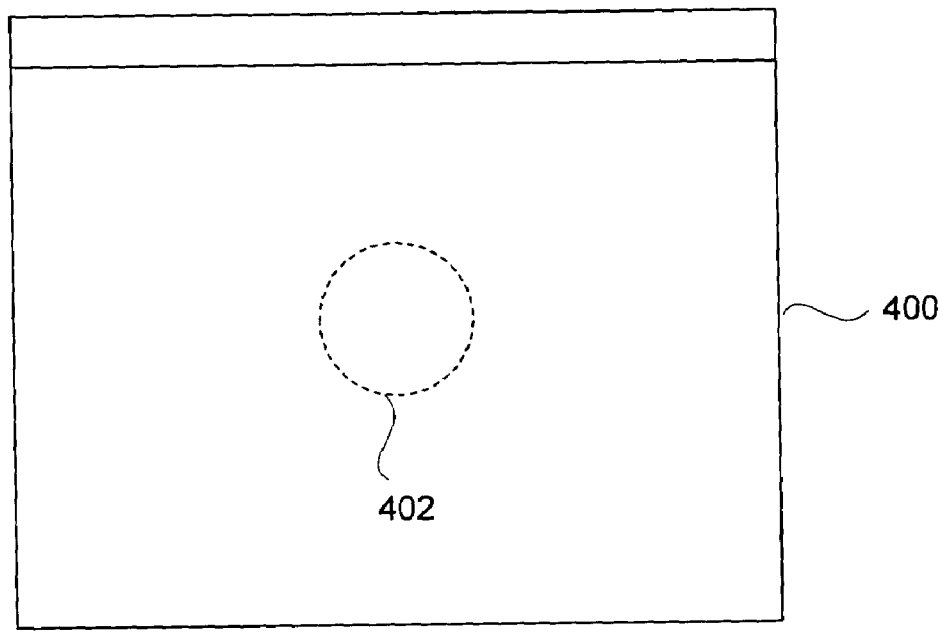
FIGS. 4A, 4D and 4E are diagrams of a media presentation window according to exemplary implementations of the invention.

FIG. 4A is a diagram of a media presentation window 400 according to one embodiment of the invention. The media presentation window 400 is, for example, suitable for use as the video presentation window utilized by the multimedia computer systems 100, 202 and 204. The media presentation window 400 presents media (e.g., video) for the benefit of the user. The media presentation window 400 shown in FIG. 4A illustrates a default area of interest 402. The default area of interest 402 is that area of the media presentation window 400 that is deemed, by default, to be the area of interest for the user. Hence, if the user has not otherwise specified an area of interest with respect to the media presentation window 400, the default area of interest 402 is utilized.

Figure 4B:
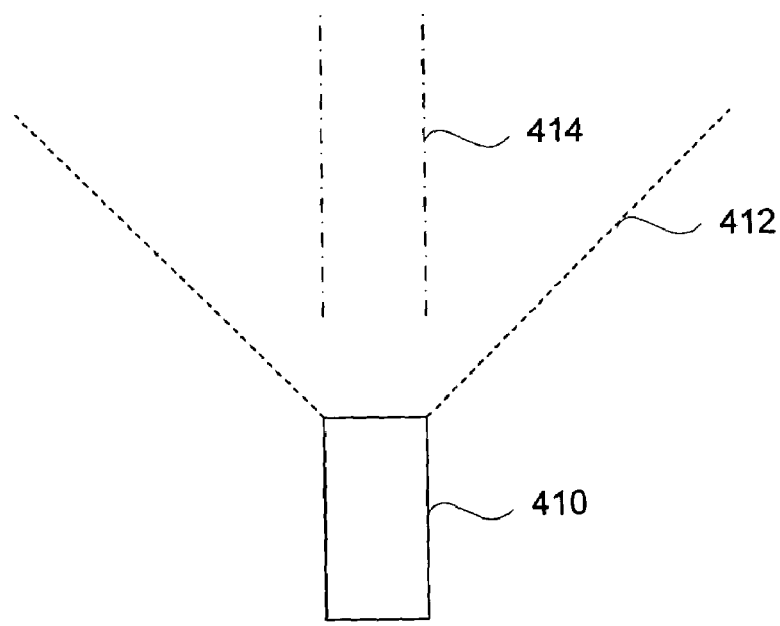
FIGS. 4B, 4C and 4F are top views of a camera utilizing focus directions when capturing video input exemplary implementations of the invention.

FIG. 4B is a top view of a camera 410 according to one embodiment of the invention. The camera 410 has a field of view 412 and a default focus direction 414. The default focus direction 414 is straight ahead from the camera 410. In other words, the default focus direction 414 corresponds to the default area of interest 402 shown in FIG. 4A. More particularly, the camera 410 captures video input pertaining to its field of view such that the images are focused in the default focus direction 414. Hence, the corresponding media (video) being presented (displayed) in the media presentation window 400 in FIG. 4A is in focus at the default area of interest 402, but potentially out of focus in other areas.

Figure 4C:
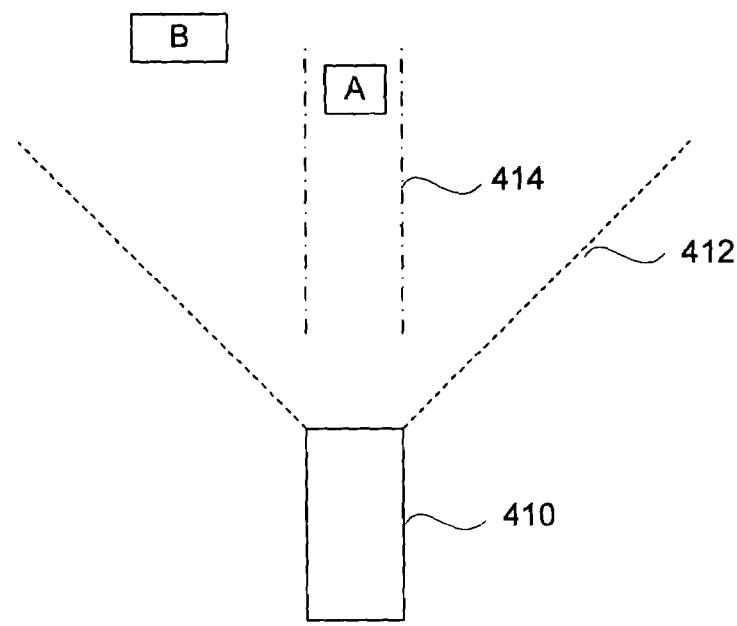

FIG. 4C illustrates the camera 410 utilizing the default focus direction 414 when capturing video input in an exemplary implementation. More particularly, as shown in FIG. 4C, within the field of view 412 of the camera 410 there are two objects, namely, Object A and Object B. These objects can represent people or things within the field of view 412 of the camera 410. Hence, in operation, the camera 410, when using its default focus direction 414, would focus on Object A. As a result, the video pickup by the camera 410 would result in Object A being in focus, whereas Object B would likely be out of focus, thus blurry or ill-defined. Unfortunately, however, if the user of the system desires to clearly view video pertaining to Object B, the camera 410 is unable to meet the user's needs when utilizing the default focus direction 414.

Figure 4D:
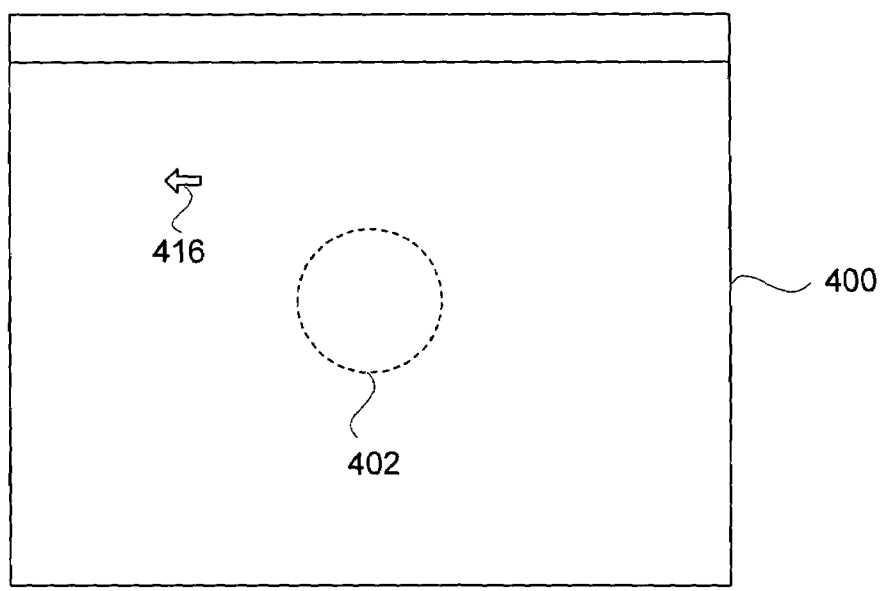
Figure 4E:
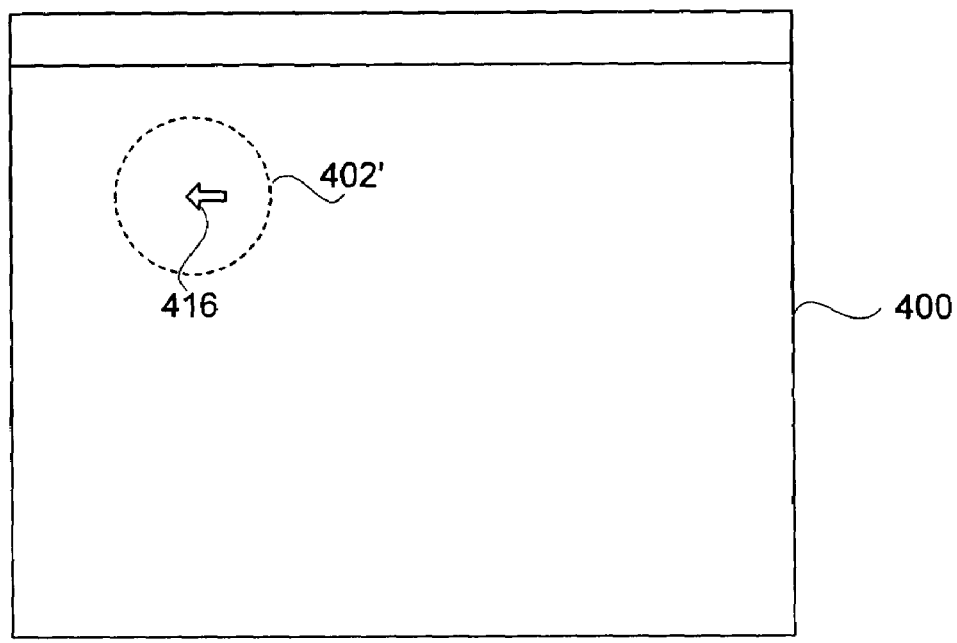

According to the invention, the user can interact with the media presentation window 400 to specify an area of interest other than the default area of interest 402 shown in FIG. 4A. In one embodiment, the user can interact with the media presentation window 400 using a pointer indicator 416 as shown in FIG. 4D. For example, the pointer indicator 416 can be a cursor that is typically moved about through use of a pointing device, such as a mouse, trackball or trackpad. After the pointer indicator 416 has been moved to the user's area of interest such as shown in FIG. 4D, the user can then inform the multimedia computer system through a selection that they are now selecting a new area of interest. Such selection can be performed by pressing a button, a key, or some other selection mechanism used with computers. As shown in FIG. 4E, after the user has made such a selection, the new area of interest 402' within the media presentation window 400 is thereafter utilized. Note that in this embodiment the pointing indicator 416 represents a center region of the new area of interest 402'.

Figure 4F:
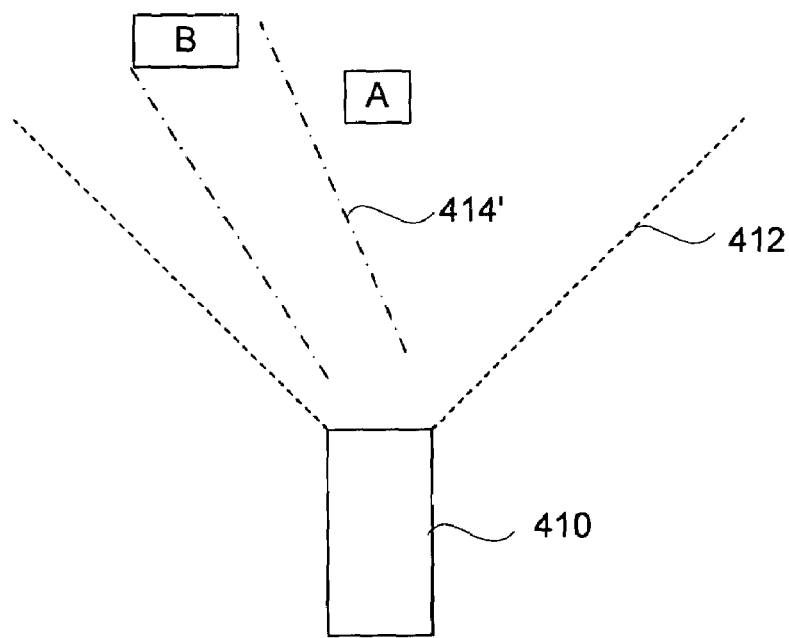

FIG. 4F illustrates the camera 410 utilizing a new focus direction 414' when capturing video input in an exemplary implementation. The new focus direction 414' corresponds to the new area of interest 402'. More particularly, as shown in FIG. 4F, the new focus direction 414' is no longer straight forward from the camera towards Object A, but is now at an angle so as to be directed towards Object B. It should be noted that the camera 410 has not itself been moved or repositioned towards Object B. Instead, the focus direction utilized by the camera 410 is now directed towards Object B. Consequently, the video pickup by the camera 410 now results in Object B being in focus, whereas Object A would now likely be out of focus and thus blurry or otherwise ill-defined. Given the relatively wide field of view 412 of the camera 410, movement of the camera 410 is typically not needed. However, in other embodiments, the redirection of the focus direction as discussed above could be further combined or utilized with cameras that are also able to be repositioned (e.g., cameras having the capability to rotate or move up and down).

As discussed above, another aspect of the invention pertains to directional control over audio pickup. Here, separate or together with alteration of a focus direction utilized by a camera when acquiring video pickup, directional audio pickup can also be utilized. The area of interest, such as specified by the user as noted above, can also be utilized to control the directional audio pickup.

Figure 4G:
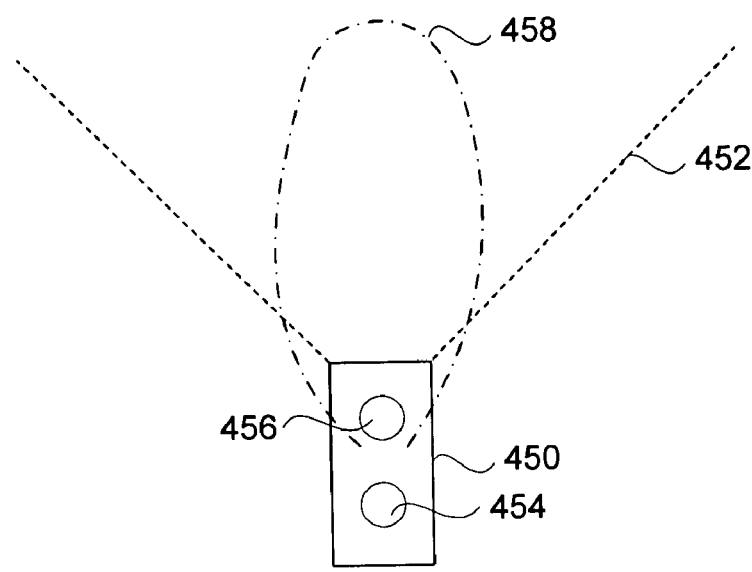
FIGS. 4G, 4H and 4I illustrate audio directions for audio pickup in exemplary implementations of the invention.

FIG. 4G illustrates a camera 450 having a field of view 452 when capturing video input in an exemplary implementation. The camera 450 also includes a first microphone 454 and a second microphone 456 for audio pickup. The first and second microphones 454 and 456 are typically spaced apart at a predetermined distance, such as 28.5 mm, in one example. By using two or more microphones, the multimedia computer system can process any audio input received by the microphones to emphasize audio pickup from certain directions and thus de-emphasize audio pickup in other directions. In effect, the multimedia computer system has directional control over the audio pickup.

Hence, according to one embodiment, using the default area of interest 402 shown in FIG. 4A, the corresponding directional audio pickup shown in FIG. 4G is a default audio direction 458. With the default audio direction 458, the multimedia computer system will emphasize audio sound received from audio sources in the default audio direction 458. In this embodiment, the default audio direction 458 is straight forward from the camera 450. It should be noted that the default audio direction 458 can be made to be generally commensurate with the default area of interest 402 shown in FIG. 4A.

Figure 4H:
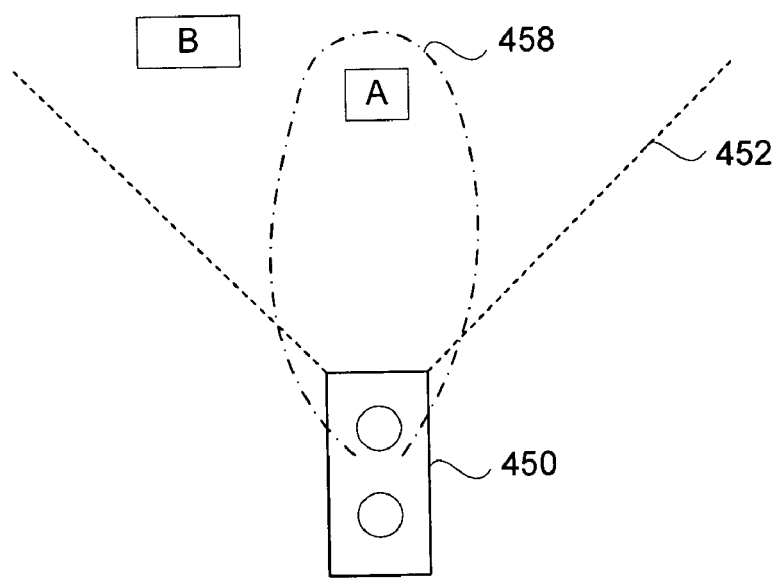

However, when the audio sound desired by a user is not straight forward from the camera 450, the audio pickup is not optimized for the user's needs. For example, as shown in FIG. 4H, if the user desires to hear audio sound provided by Object A, the default audio direction 458 is suitable to be utilized by the multimedia computer system. In this case, the audio sound of interest to the user is within the default area of interest 402 as shown in FIG. 4A with respect to the media presentation window 400. However, if instead, the user desires to hear audio sound associated with Object B, then the default audio direction 458 would be inappropriate.

Figure 4I:
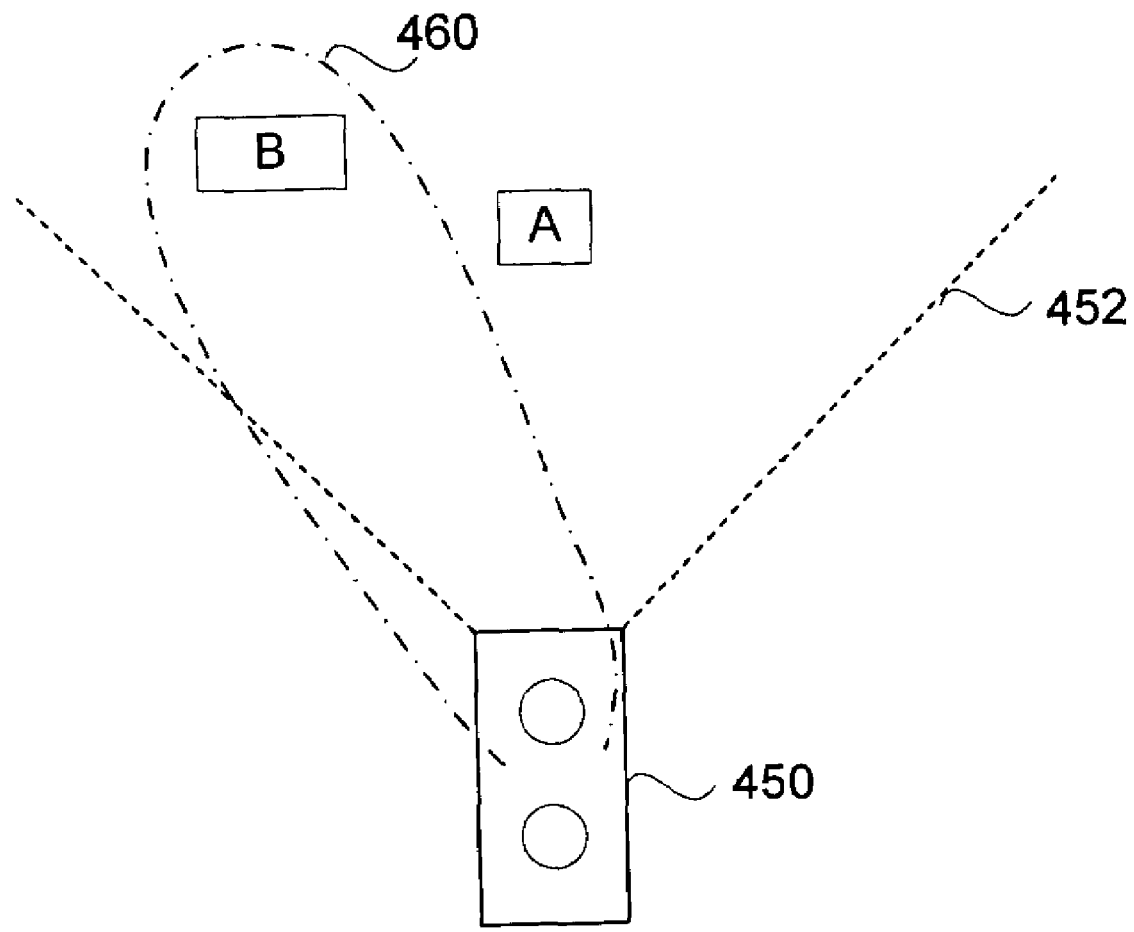

According to this aspect of the invention, the audio direction can be redirected to a different area of interest. Hence, as shown in FIG. 4I, if the user specifies a new area of interest 402' with respect to the media presentation window 400, then the multimedia computer system can process the audio input from the microphones 454 and 456 to provide a new audio direction 460. The new audio direction 460 is no longer straight forward from the camera 450 but is now directed at an angle so as to point to Object B, thereby enhancing the audio sound associated with Object B.

The ability to provide audio directions for sound input is achieved through digital signal processing of the audio inputs from the plurality of microphones. Such digital signal processing utilizes beam forming and beam steering techniques which are well-known in the art. Well-known algorithms with various variations or enhancements can be utilized depending upon the application and criteria. Further, adaptive algorithms can be utilized for perhaps better results, such as increased noise cancellation. For additional details on beam forming and beam steering, see "Adaptive Signal Processing," by Widrow and Sterns, Prentice Hall. One useful algorithm for such that advantageously preserves the desired signal is known as the Griffiths-Jim algorithm.

Figure 5:
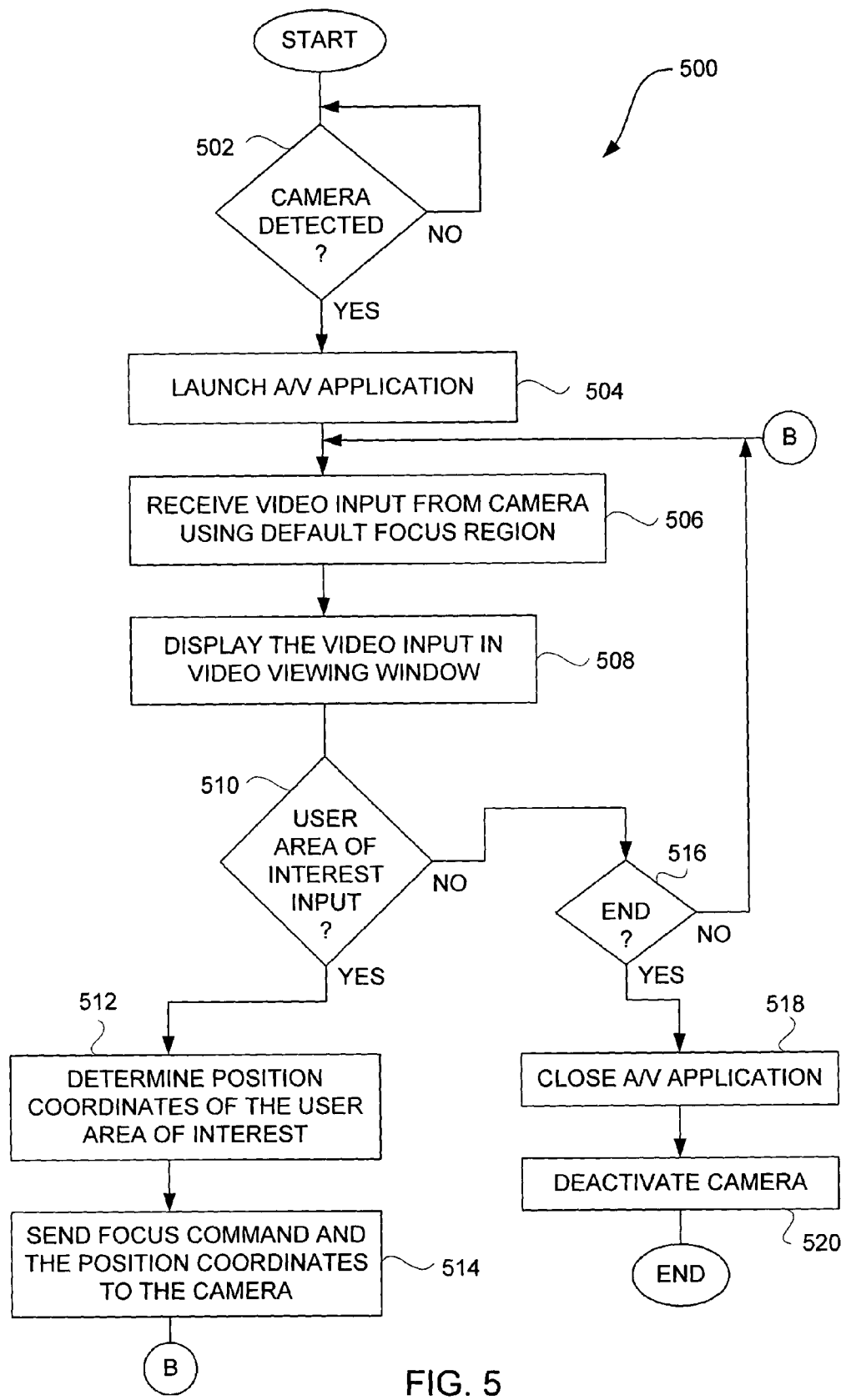
FIG. 5 is a flow diagram of a video focusing process according to one embodiment of the invention.

FIG. 5 is a flow diagram of a video focusing process 500 according to one embodiment of the invention. The video focusing process 500 can, for example, be performed by the multimedia computer system 100 illustrated in FIG. 1 or the multimedia computer systems 202 or 204 illustrated in FIG. 2.

The video focusing process 500 begins with a decision 502 that determines whether a camera has been detected. In other words, the decision 502 determines whether a camera has recently been coupled to the multimedia computer system. Typically, the camera is attached by a cable to a peripheral port of the multimedia computer system. Hence, when the decision 502 determines that a camera has not yet been detected, then the video focusing process 500 awaits the attachment of a camera. On the other hand, when the decision 502 determines that a camera has been detected, then the video focusing process 500 continues. In other words, the video focusing process 500 can be activated upon attachment of a camera to the multimedia computer system. In other embodiments, the video focusing process 500 could be initiated or activated by a user and thus not include or bypass the decision 502.

Once the video focusing process 500 is activated, an audio/video (A/V) application is launched 504. The A/V application operates on the multimedia computer system. The A/V application serves to receive audio and/or video input from input devices (e.g., camera(s) and/or microphone(s)) and to output the audio and/or video to an appropriate output device (e.g., monitor and/or speaker(s)).

After the A/V application has been launched 504, video input from the camera is received 506 using a default focus region. As noted previously, the camera will use a default focus direction when initiated. Hence, the video input being received 506 from the camera is focused in the default focus direction. Next, the video input that was received 506 from the camera is displayed 508 in a video viewing window. For example, the video viewing window can be the video presentation window 112 shown in FIG. 1. A user of the multimedia computer system is able to observe the video viewing window and thus view the video input being provided by the camera. The user can also interact with the video viewing window to select an area of interest. A decision 510 determines whether a user area of interest has been input. When the decision 510 determines that a user area of interest has been input, then position coordinates of the user area of interest are determined 512.

Next, a focus command and the position coordinates are sent 514 to the camera. At this point, the camera can then refocus itself to the region specified by the position coordinates. In one embodiment, the camera has an auto-focus mechanism that is activated in response to the focus command and the position coordinates. Following the operation 514, the video focusing process 500 returns to repeat the operation 506 and subsequent operations so that additional video input can be received and displayed and so that the user can, if desired, select other areas of interest.

On the other hand, when the decision 510 determines that a user area of interest has not been input, then a decision 516 determines whether the video focusing process 500 should end. When the decision 516 determines that the video focusing process 500 should not end, then the video focusing process 500 returns to repeat the operation 506 and subsequent operations. Alternatively, when the decision 516 determines that the video focusing process 500 should end, then the A/V application closes 518 and the camera is deactivated 520. Following the operation 520, the video focusing process 500 is complete and ends.

Figure 6A:
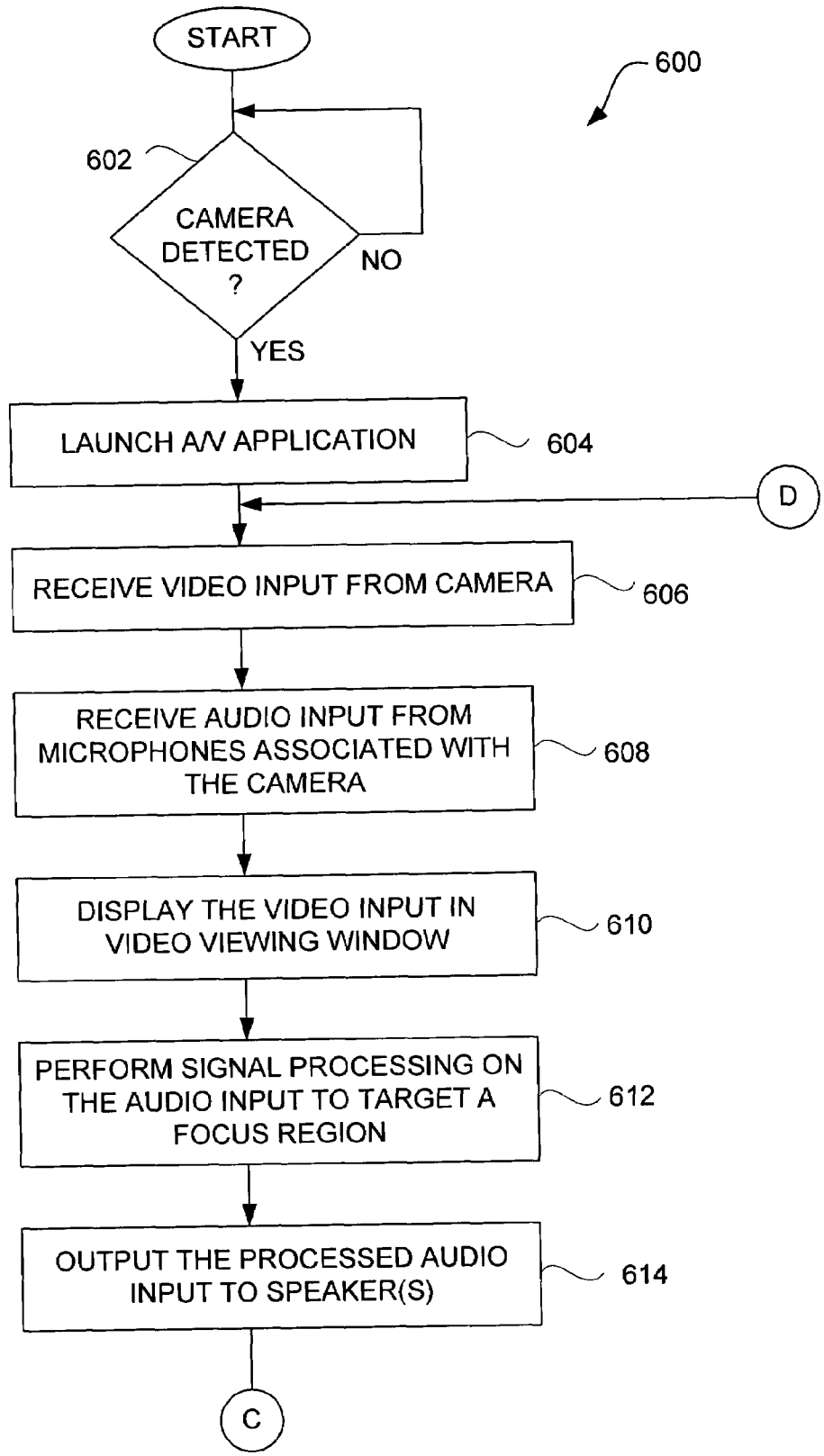
FIGS. 6A and 6B are flow diagrams of an audio focusing process according to one embodiment of the invention.
Figure 6B:
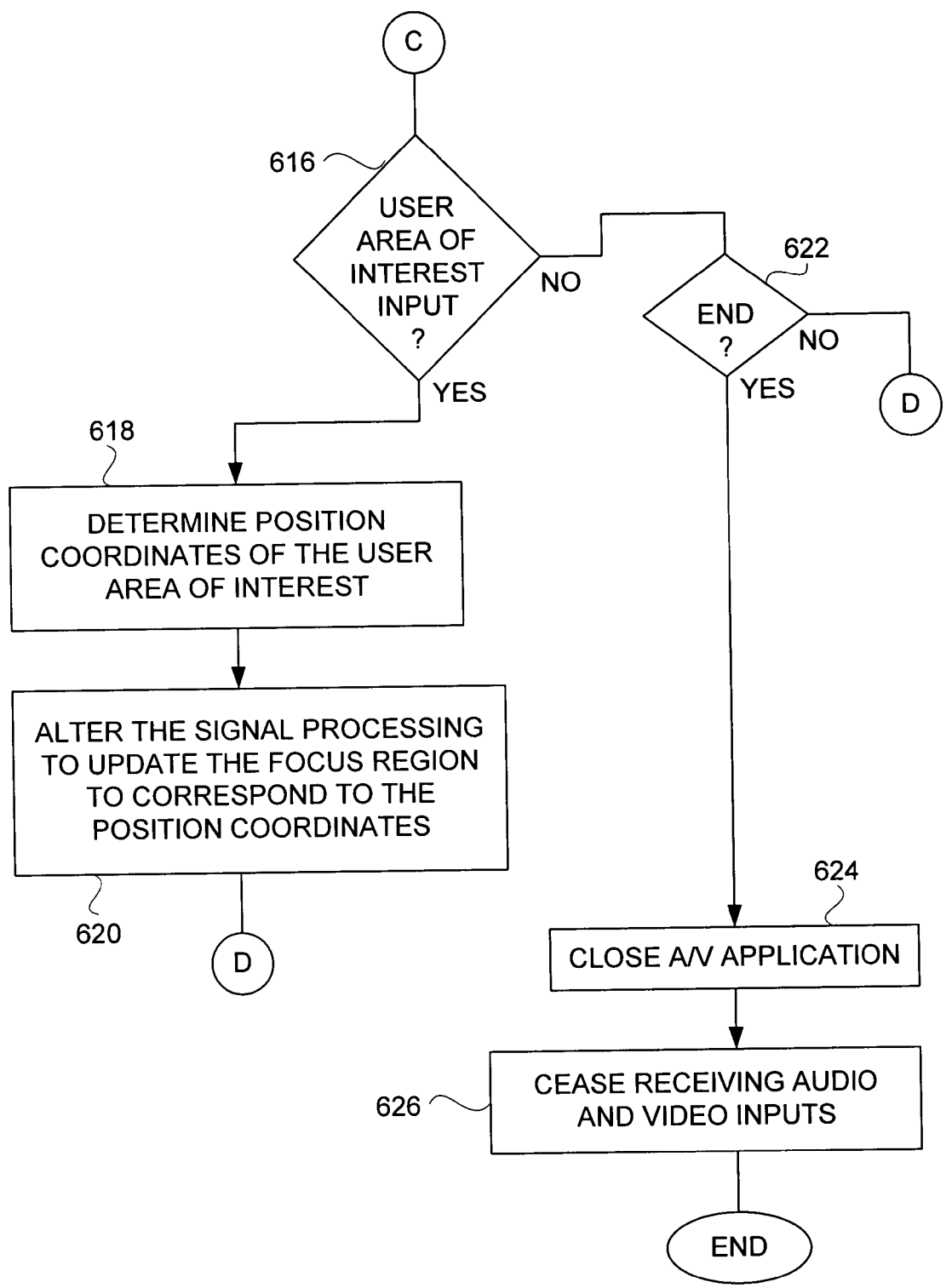

FIGS. 6A and 6B are flow diagrams of an audio focusing process 600 according to one embodiment of the invention. The audio focusing process 600 can, for example, be performed by the multimedia computer system 100 illustrated in FIG. 1 or the multimedia computer systems 202 or 204 illustrated in FIG. 2.

The audio focusing process 600 begins with a decision 602 that determines whether a camera has been detected. In other words, the decision 602 determines whether a camera has recently been coupled to the multimedia computer system. Typically, the camera is attached by a cable to a peripheral port of the multimedia computer system. When the decision 602 determines that a camera has not yet been detected, the audio focusing process 600 awaits the detection of a camera. On the other hand, when the decision 602 determines that a camera has been detected, the audio focusing process 600 continues. In other words, the audio focusing process 600 can be activated upon attachment of a camera to the multimedia computer system. In other embodiments, the audio focusing process 600 could be initiated or activated by a user and thus not include or bypass the decision 602.

In any case, once the audio focusing process 600 is activated, an audio-video application is launched 604. Then, video input from a camera is received 606. Additionally, audio input from microphones associated with the camera are received 608. Here, the microphones can be integral with the camera or can be separate from the camera but still associated with the multimedia computer system hosting the camera.

The video input that is received 606 from the camera is displayed 610 in a video viewing window presented on a monitor of the multimedia computer system. For example, the video viewing window can represent the multimedia presentation window 112 shown in FIG. 1. Further, signal processing is performed 612 on the audio input from the microphones to target a focus region. The focus region is a user-specified area of interest from which the audio sounds are to be acquired. Initially, the focus region can be a default focus region that is predetermined and not user-specified. Following the signal processing, the processed audio input is output 614 to one or more speakers.

Next, a decision 616 determines whether a user area of interest has been input. A user can input a user area of interest through interaction with a graphical user interface. For example, the user can interact with the video viewing window to select a user area of interest. The user area of interest can also be referred to as a region of interest. When the decision 616 determines that a user area of interest has been input, then position coordinates of the user area of interest are determined 618. When the user area of interest is input with respect to the video viewing window, the coordinates of the user area of interest can be acquired with respect to the video viewing window. Then, the signal processing that is utilized to target the audio input towards a focus region is altered 620 such that the focus region is updated to correspond to the position coordinates.

In other words, the focus region utilized to acquire audio sound is altered or changed based on the area of interest that has been specified by the user. Here, to effectuate the new focus region, the signal processing is altered 620 so as to process the audio input to result in emphasis to the audio sound associated with the region of interest.

Following the operation 620, the audio focusing process 600 returns to repeat the decision 606 and subsequent operations so that additional video and audio inputs can be similarly processed, and so that the user can, if desired, select other areas of interest.

On the other hand, when the decision 616 determines that a user area of interest has not been input, then a decision 622 determines whether the audio focusing process 600 should end. When the decision 622 determines that the audio focusing process 600 should not end, then the audio focusing process 600 returns to repeat the operation 606 and subsequent operations. Alternatively, when the decision 622 determines that the audio focusing process 600 should end, the A/V application is closed 624 and the multimedia computer system ceases 626 receiving further audio and video inputs. Following the operation 626, the audio focusing process 600 is complete and ends.

Figure 7:
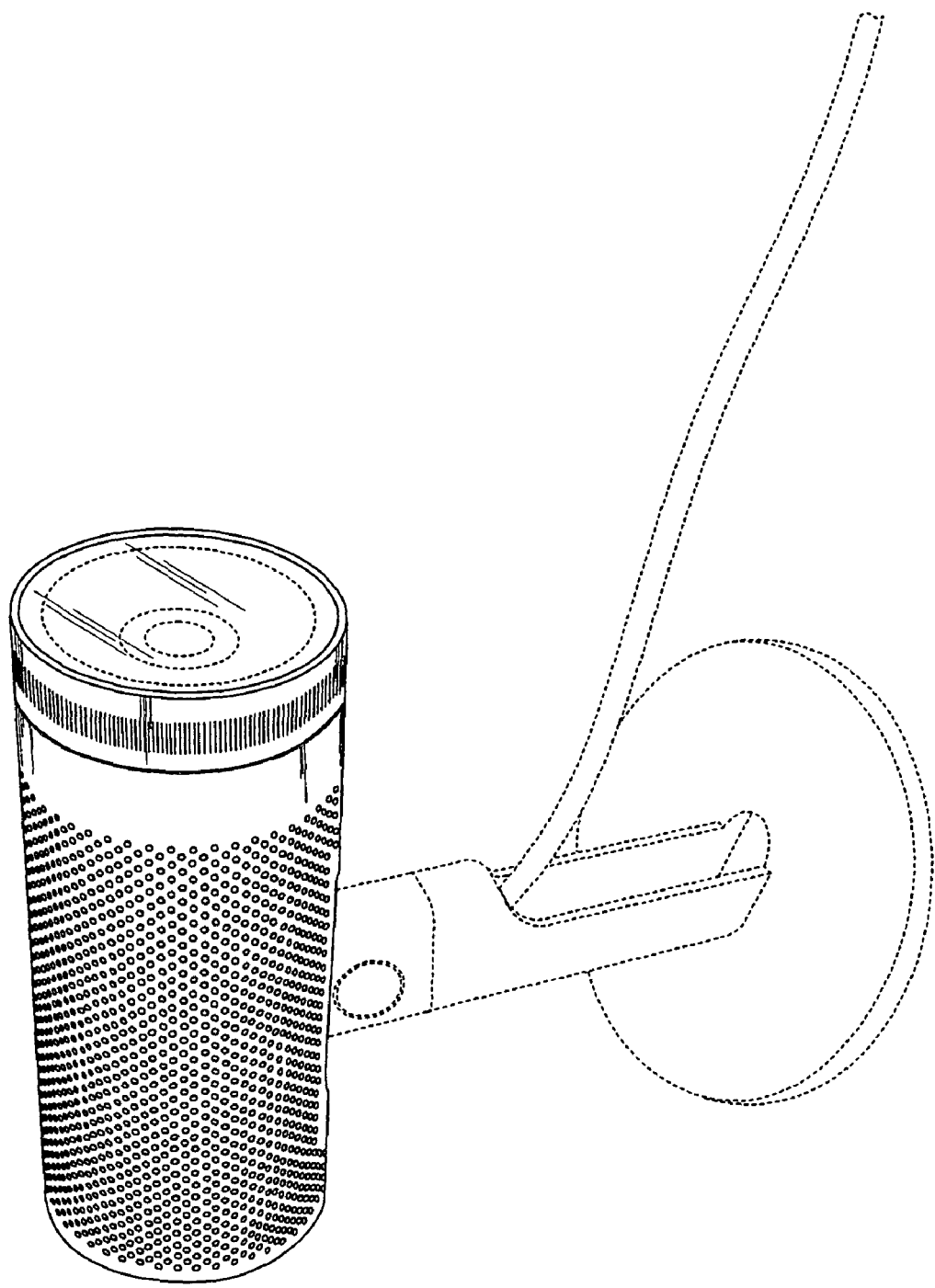
FIGS. 7-9 are diagrams of a camera according to one embodiment.
Figure 8:
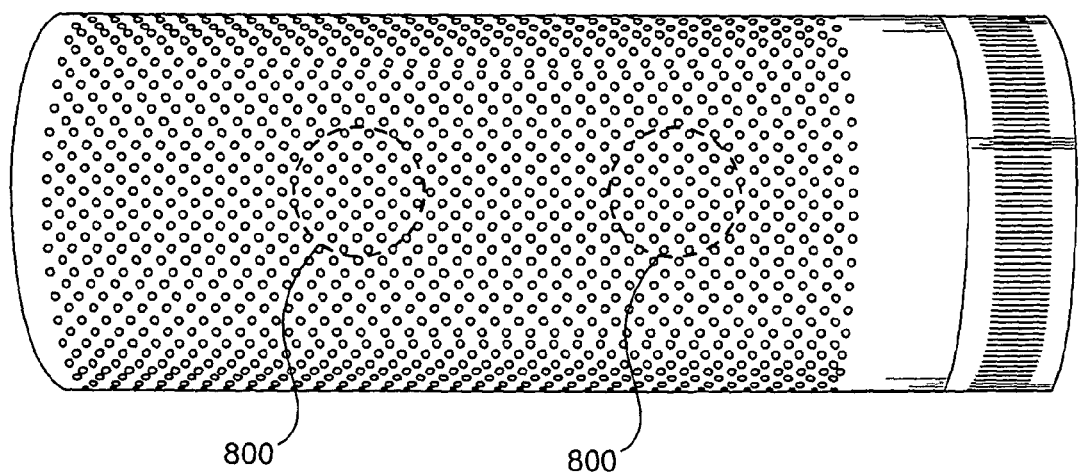
Figure 9:
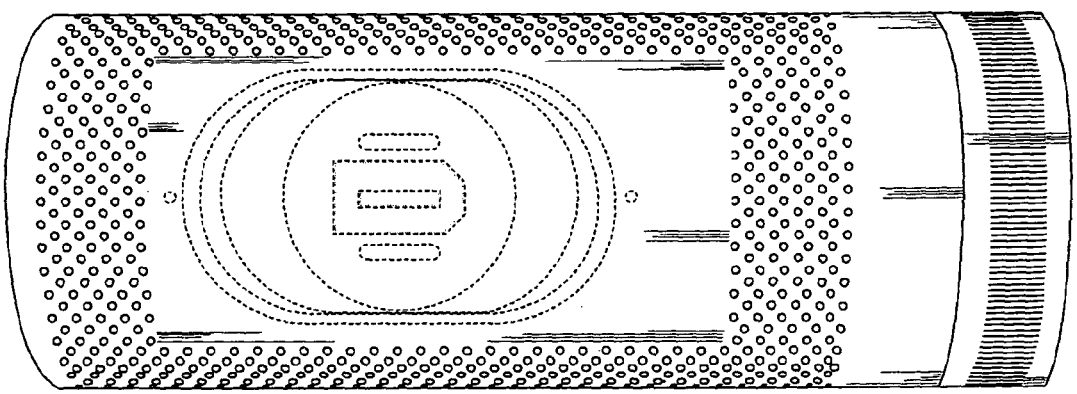

The camera described herein is used to acquire video input. As noted above, the camera typically has an auto-focus feature that can be computer-initiated. Further, according to some embodiments, the camera can include a plurality of microphones to provide audio pickup. FIGS. 7-9 are diagrams of a camera according to one embodiment. The camera can, for example, be used as the camera 106 illustrated in FIG. 1 or the camera 210, 220 illustrated in FIG. 2. FIG. 7 is a perspective diagram of the camera. FIG. 8 is a top view of the camera indicating a pair of microphones 800 internal to the housing for the camera. The housing of the camera has openings to help audio pickup by the microphones 800. The audio sound arrives at the microphones 800 via holes in the housing of the camera. FIG. 9 is a bottom view of the camera which illustrates a FireWire™ connector (port) that can couple to a peripheral cable (FireWire™ cable) which couples to a computing apparatus. Additional information for one design suitable for use as the camera is provided in U.S. Design patent application No. 29/178,686, entitled "CAMERA," filed on Mar. 28, 2003, which is incorporated herein by reference.

The various aspects, features, embodiments or implementations of the invention described above can be used alone or in various combinations.

The invention is preferably implemented by software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different embodiments or implementations may yield one or more of the following advantages. One advantage of the invention is that video input being displayed can be focused in accordance with a recipient's area of interest. Another advantage of the invention is that audio input to be output to one or more speakers can be processed such that sound is effectively picked-up in a directional manner in accordance with a recipient's area of interest. Another advantage of the invention is that the focusing of video input and/or the processing for directional pickup of audio can be performed locally or remotely by way of a network.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An electronic device, comprising:
a processor for executing an operating system program and a media content presentation program;
a media content pickup device that includes at least a camera and a microphone operatively connected to said processor, said media content pickup device arranged to capture media content input that includes video content by the camera and audio content by the microphone, said media content pickup device arranged to automatically focus on a user-specified region of video interest of the media content input without moving the camera in the media content pickup device and said media content pickup device arranged to automatically focus on a user specified region of audio interest of the media content input independent of the user specified region of video interest;
an auto-focus mechanism of said media content pickup device arranged to automatically focus on said user-specified region of interest in response to a focus command using position coordinates that identify said user-specified region of interest; and
a media output path to receive and to carry the focused media content input.

2. An electronic device as recited in claim 1, wherein the user-specified region of interest is specified by a user through interaction with a graphical user interface.

3. An electronic device as recited in claim 2, wherein the graphical user interface is provided by the media content presentation program that is executed by said processor.

4. An electronic device as recited in claim 2, wherein said media output path carries the focused media content input to be provided to a media output device, the media output device being part of said electronic device or separate from said electronic device.

5. An electronic device as recited in claim 4,
wherein said media output device is a monitor,
wherein the graphical user interface is displayed on said monitor, and
wherein the graphical user interface includes at least a media content display window.

6. An electronic device as recited in claim 5, wherein the user-specified region of interest is specified by the user with reference to the media content display window.

7. An electronic device as recited in claim 4, wherein said media output device is a monitor.

8. An electronic device as recited in claim 4, wherein said media output device is at least one speaker.

9. An electronic device as recited in claim 1, wherein the media content input is at least one of audio content or video content.

10. An electronic device as recited in claim 1, wherein said media content pickup device is at least one of a camera and a plurality of microphones.

11. An electronic device as recited in claim 1, wherein said electronic device is one of a mobile telephone, a personal computer, a personal digital assistant, and a handheld computer.

12. A computer system, comprising:
a processor for executing a video application program;
a media content pickup device including at least a microphone and a camera operatively each connected to said processor, said camera arranged to capture video input in accordance with its field of view associated with the captured video and said microphone arranged to capture audio content in accordance with its field of view associated with the captured audio content, and said camera arranged to automatically focus on a determined region of the field of view associated with the captured video without moving the camera, and said microphone arranged to automatically focus on a determined region of the field of view associated with the captured audio independent of the video, the determined region being determined in accordance with a user input;
an auto-focus mechanism of said microphone and said camera arranged to automatically focus on said determined region of the field of view in response to a focus command using position coordinates that identify said determined region of the field of view; and
a data output means operatively connected to said processor, said data output means operating to provide the focused video input for display.

13. A computer system as recited in claim 12, wherein said processor receives a user input that indicates the determined region of the field of view.

14. A computer system as recited in claim 13, wherein the user input is with respect to a window displayed on said display.

15. A computer system as recited in claim 14, wherein the user input is a user selection of a region of the window.

16. A computer system as recited in claim 12 further comprising:
at least one microphone for sound pickup.

17. A computer system as recited in claim 16, wherein the video application program is an audio-video application, and wherein said processor receives the sound pickup from said at least one microphone and supplies audio output to a speaker.

18. A computer system as recited in claim 17, wherein the speaker is coupled to and associated with said computer system.

19. A computer system as recited in claim 12 further comprising:
a plurality of microphones for sound pickup, said microphones having a known positional relationship to one another,
wherein said microphones are integral with said camera.

20. A computer system as recited in claim 19, wherein said processor receives audio input from each of said microphones and processes the audio input to emphasize audio sound from the determined region that has been determined in accordance with the user input.

21. A method for altering a focus location for a media content pickup device having at least a camera and a microphone coupled to a computing apparatus, said method comprising:
receiving video input from the camera;
displaying the video input in a video viewing window of a monitor;
receiving an identification of a focus region that has been specified by a user by selecting an area of the video viewing window;
sending a video focus command to an auto-focus mechanism of said camera independent of an audio focus command to an auto focus mechanism of said microphone;
sending position coordinates identifying said focus region to said video and said audio auto-focus mechanism ; and
causing the camera and the microphone to focus on the focus region without moving the camera.

22. A method as recited in claim 21, wherein the user moves a curser image over the video viewing window using a pointing device to an area of interest, and then selects the focus region by clicking on the area of interest.

23. A method as recited in claim 22, wherein the user performs a button press to select the focus region.

24. A method as recited in claim 23, wherein the button press is with respect to a pointing device.

25. A method as recited in claim 24, wherein the pointing device is a mouse, trackball or a trackpad.

26. A method as recited in claim 21, wherein the user moves a position reference image over the video viewing window using a pointing device to an area of interest, and then selects the focus region by clicking on the area of interest.

27. A method as recited in claim 21, wherein the focus region is an area of interest specified by the user.

28. A method as recited in claim 21, wherein said receiving of the video input is supplied from a first computing apparatus to a second computing apparatus, and said displaying of the video input and said receiving of the focus region are performed on the second computing apparatus.

29. A method as recited in claim 21, wherein the computing apparatus is one of a mobile telephone, a personal computer, a personal digital assistant, and a handheld computer.

30. A video conferencing system operable over a network, said video conferencing system comprising:
a first computer system including at least a first processor for executing a first operating system program and a first video application program, a first media capture device having at least a first microphone and a first camera to capture first video input, and a first monitor; and
a second computer system operatively connectable to said first computer system via the network, said second computer system including at least a second processor for executing a second operating system program and a second video application program, a second media capture device having at least a second microphone and a second camera to capture video input, and a second monitor;
an auto-focus mechanism of said second media capture device arranged to automatically focus on a selected region of interest, said auto-focus mechanism being arranged to automatically focus using position coordinates that identify said selected region of interest;
wherein when said first computer system and said second computer system are involved in a video conference, said first monitor displays the second video input provided by said second camera via the network, and said second monitor displays the first video input provided by said first camera via the network,
wherein when a first user interacts with a window including the second video input presented on said first monitor to select said region of interest with respect to the second video input, said second media capture device then automatically focuses itself using said auto-focus mechanism so that the second video input and said second microphone are focused on the region of interest without moving said second camera,
wherein the first microphone and the first camera operate independent of each other, and wherein the second microphone and the second camera operate independent of each other.

31. A video conferencing system as recited in claim 30, wherein the first user interfaces with the first graphical user interface by moving a graphical indicator over the window to identify the region of interest and then indicating its selection.

32. A video conferencing system as recited in claim 30,
wherein said first computer system further includes at least a first plurality of microphones and a first speaker,
wherein said second computer system further includes at least a second plurality of microphones and a second speaker,
wherein second audio input obtained by said second plurality of microphones is provided to said first computer system via the network and then output to said first speaker,
wherein first audio input obtained by said first plurality of microphones is provided to said second computer system via the network and then output to said second speaker, and
wherein said second multimedia computer system performs processing on the second audio input based on the region of interest selected by the first user, whereby the second audio input is processed so as to emphasize audio sound from the region of interest.

33. A video conferencing system as recited in claim 30,
wherein said first plurality of microphones are internal to a housing of said first camera, and
wherein said second plurality of microphones are internal to a housing of said second camera.

* * * * *

UNITED STATES PATENT AND TRADEMARK OFFICE
CERTIFICATE OF CORRECTION

PATENT NO. : 7,559,026 B2  Page 1 of 1
APPLICATION NO. : 10/651918
DATED : July 7, 2009
INVENTOR(S) : Girish et al.

It is certified that error appears in the above-identified patent and that said Letters Patent is hereby corrected as shown below:

On the Title Page

Item (75)   Inventors: change "Muthy K. Girish" to --Muthya K. Girish--.

Signed and Sealed this

Ninth Day of February, 2010

David J. Kappos
*Director of the United States Patent and Trademark Office*